US012100110B2

(12) United States Patent
Kratz et al.

(10) Patent No.: US 12,100,110 B2
(45) Date of Patent: Sep. 24, 2024

(54) AR SYSTEM FOR PROVIDING INTERACTIVE EXPERIENCES IN SMART SPACES

(71) Applicants: Sven Kratz, Mercer Island, WA (US); Andrés Monroy-Hernández, Seattle, WA (US); Yu Jiang Tham, Seattle, WA (US)

(72) Inventors: Sven Kratz, Mercer Island, WA (US); Andrés Monroy-Hernández, Seattle, WA (US); Yu Jiang Tham, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 17 days.

(21) Appl. No.: 17/841,397

(22) Filed: Jun. 15, 2022

(65) Prior Publication Data

US 2023/0410437 A1    Dec. 21, 2023

(51) Int. Cl.
*G06T 19/00*     (2011.01)
*G06F 3/01*      (2006.01)
*H04L 67/025*    (2022.01)

(52) U.S. Cl.
CPC .......... *G06T 19/006* (2013.01); *G06F 3/011* (2013.01); *G06F 3/016* (2013.01); *H04L 67/025* (2013.01)

(58) Field of Classification Search
CPC ......... G06F 3/0481; G06F 3/017; G06T 11/00
(Continued)

(56) References Cited

U.S. PATENT DOCUMENTS 10,901,689 B1 *  1/2021  Trim ................. G06F 9/451
2015/0346701 A1  12/2015  Gordon et al.
(Continued)

FOREIGN PATENT DOCUMENTS

CN       111669430 A      9/2020
KR    1020220080223 A      6/2022
WO     2021218442 A1     11/2021

OTHER PUBLICATIONS

International Search Report and Written Opinion for International Application No. PCT/US2023/024843, dated Sep. 26, 2023 (Sep. 26, 2023)—10 pages.
(Continued)

*Primary Examiner* — Thomas J Lett
(74) *Attorney, Agent, or Firm* — CM Law; Stephen J. Weed

(57) ABSTRACT

Interactive experiences are generated using an augmented reality (AR) system that leverages the native input and output capabilities of AR devices to generate immersive and interactive experiences in smart spaces that combine visually-represented programming logic, AR content, and IoT devices. The system connects IoT devices with each other in a native AR environment, provides virtual content and logic gates, scripts sequences and loops of actions, solves visibility issues for IoT devices that are far apart, and designs logic gates and flow circuits that best support user intentions when generating interactive experiences in smart spaces. The interactive experience is produced by generating a program of behaviors of selected IoT devices using logic gates and control circuits connected to the IoT devices in a visual programming interface of the AR device. Once completed, the program of behaviors is executed by a runtime module to control the IoT devices during the interactive experience.

20 Claims, 8 Drawing Sheets

(58) Field of Classification Search
USPC .......................................................... 715/736
See application file for complete search history.

(56) References Cited

U.S. PATENT DOCUMENTS

| | | |
|---|---|---|
| 2017/0256096 A1* | 9/2017 | Faaborg ................ G06T 19/003 |
| 2018/0196522 A1 | 7/2018 | Rochford et al. |
| 2019/0114061 A1 | 4/2019 | Daniels et al. |
| 2020/0043239 A1 | 2/2020 | Lee |
| 2020/0092376 A1 | 3/2020 | Morris |
| 2021/0097286 A1 | 4/2021 | Lehrich et al. |
| 2021/0149551 A1 | 5/2021 | Lee |
| 2023/0046155 A1* | 2/2023 | Lu ........................... G06T 15/20 |

OTHER PUBLICATIONS

International Search Report and Written Opinion for International Application No. PCT/US2023/024830, dated Sep. 21, 2023 (Sep. 21, 2023)—11 pages.
Ken Figueredo et al., A Scalable_ Standard-Based Approach for IoT Data Sharing and Ecosystem Monetization, Sep. 8, 2020, IEEE Internet of Things Journal, vol. 9, No. 8, pp. 5645-5652 (Year: 2020).
Teemu Leppanen et al., Augmented Reality Web Applications with Mobile Agents in the Internet of Things, Sep. 1, 2014, IEEE International Conference on Next Generation Mobile Apps, Services and Technology, pp. 1-6 (Year: 2014).

* cited by examiner

AR SYSTEM FOR PROVIDING INTERACTIVE EXPERIENCES IN SMART SPACES

CROSS-REFERENCE TO RELATED APPLICATIONS

This application is related to U.S. patent application Ser. No. 17/841,365, entitled "Standardized AR Interfaces for IoT Devices" filed on Jun. 15, 2022, now U.S. Pat. No. 12,019,838. The contents of that patent application is hereby incorporated by reference in its entirety.

TECHNICAL FIELD

The present subject matter relates to systems and methods for enabling users of augmented reality (AR) systems to interact with Internet of Things (IoT) devices, and, more particularly, to systems and methods for providing immersive and interactive experiences that combine both visually represented programming logic, AR content, and IoT technologies.

BACKGROUND

The so-called "Internet of Things" or "IoT" is a network of physical objects that are embedded with sensors, software, and other technologies for enabling connection and exchange of data with other devices via the Internet. For example, IoT devices are used in home automation to control lighting, heating and air conditioning, media and security systems, and camera systems. A number of IoT enabled devices have been provided that function as smart home hubs to connect different smart home products. IoT devices have been used in a number of other applications as well. Application layer protocols and supporting frameworks have been provided for implementing such IoT applications. Artificial intelligence has also been combined with the Internet of Things infrastructure to achieve more efficient IoT operations, improve human-machine interactions, and enhance data management and analytics.

A growing number of IoT devices have become available for home consumers and public and private entities. The IoT devices range from smart red, green, blue (RGB) light bulbs to automated plant watering systems. At the same time, the adoption of AR technology is growing, for instance in social messaging platforms such as SNAPCHAT®. Currently, augmented reality (AR) is mainly used to augment photos and videos and also for interactive applications (e.g., connected lenses games on SNAPCHAT®). However, little work has been done on the subject of developing tools for producers of interactive experiences that simultaneously leverage AR and IoT technologies.

BRIEF DESCRIPTION OF THE DRAWINGS

Features of the various implementations disclosed will be readily understood from the following detailed description, in which reference is made to the appending drawing figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1:
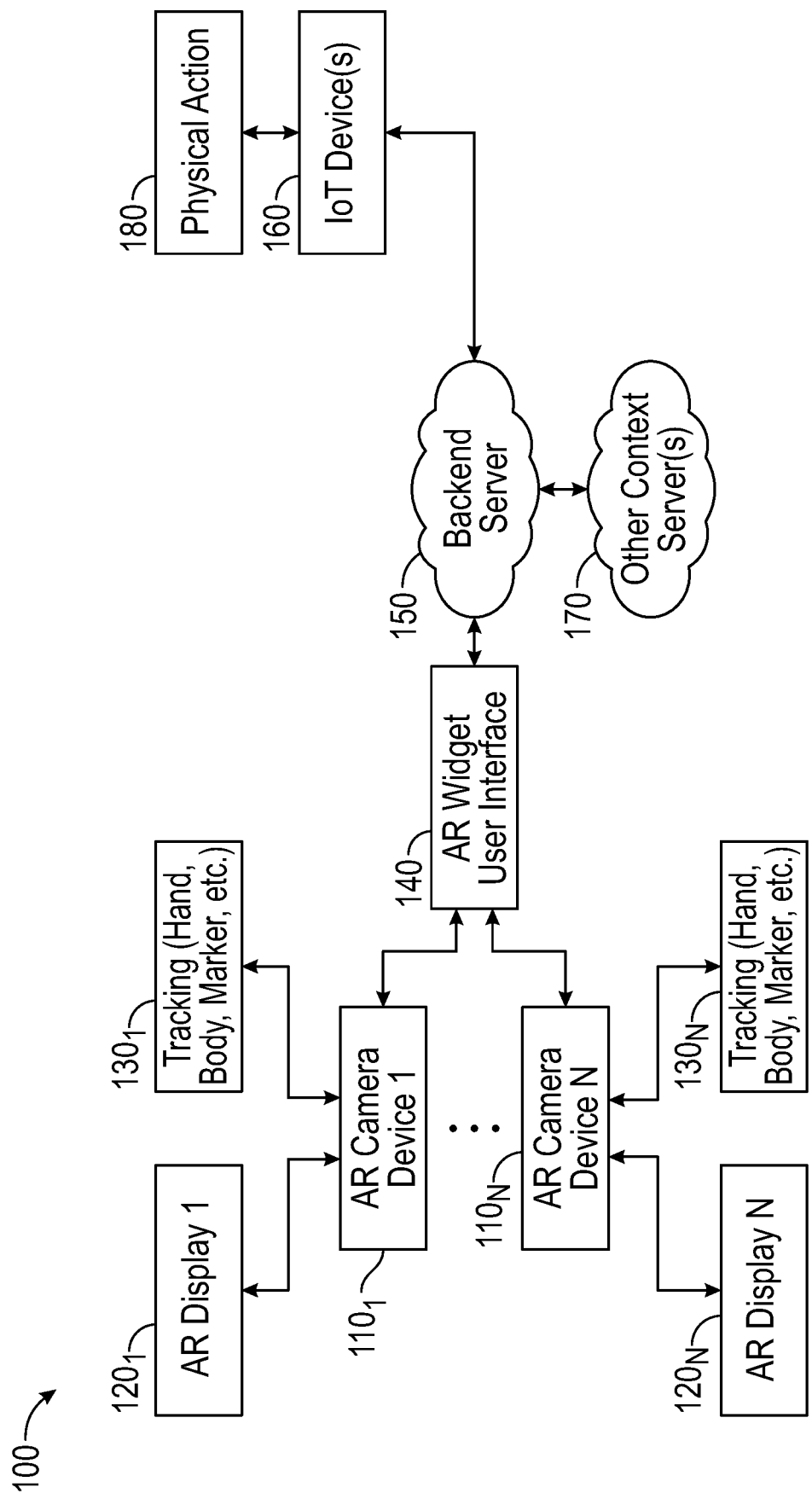
FIG. 1 is a general block diagram of a system for interfacing augmented reality (AR) camera devices to Internet of Things (IoT) devices.

Augmented Reality (AR) devices and Internet of Things (IoT) devices are now available to many households and public and private entities. This enables the possibility of producing interactive "smart" spaces that combine both AR and IoT technologies. However, little work has been done to develop tools for producers of interactive experiences who wish to leverage AR and IoT technologies at the same time. The following disclosure describes a system that leverages the native input and output capabilities of AR devices to produce immersive and interactive experiences in smart spaces that combine visually-represented programming logic, AR content, and IoT devices. The following disclosure also describes the user interface and interaction techniques that are used by the system to realize a number of common programming operations supported by the system.

To build an AR interface for producing interactive experiences in "smart" spaces, the system and method described herein connects IoT devices with each other in a native AR environment, provides virtual content and logic gates, scripts sequences and loops of actions, solves visibility issues for IoT devices that are far apart, and designs logic gates and flow circuits that best support user intentions when producing interactive experiences in smart spaces. The interactive experience is produced by generating a program of behaviors of selected IoT devices using logic gates and control circuits connected to the IoT devices in a visual programming interface of the AR device. Once completed, the program of behaviors is executed by a runtime module to control the IoT devices during the interactive experience.

The method described herein enables users to generate interactive experiences using an augmented reality (AR) device to interact with at least one Internet of Things (IoT) device. The user provides a selection of at least one IoT device to be controlled by the AR device during the interactive experience, and an AR user interface widget or graphical representation for the selected at least one IoT device is provided to the AR device as an overlay on a display of the AR device. As used herein, a "widget" is an application, or a component of an interface, that enables a user to perform a function or access a service. An interactive experience is programmed by generating a program of behaviors of the selected at least one IoT device using at least one of logic gates or control circuits connected to the selected at least one IoT device in a visual programming interface of the AR device. The logic gates and control elements together specify the behaviors to be performed by the IoT device in the visual programming interface.

The program of behaviors of the selected at least one IoT device is based on input/output rules for the at least one IoT device, where the input/output rules can be represented via Boolean logic, arithmetic functions, or any other n-ary mappings or operations that are definable mathematically. The programming may further include selecting the control circuits to express functions including at least one of a threshold, a clamping function, or an oscillator and generating a sequence of actions to be performed by the at least one IoT device during the interactive experience. Connectors also may be accessed in the visual programming interface of the AR device to connect respective IoT devices, logic gates, and control circuits to specify program logic and information flow to be used in the interactive experience. The program of behaviors is executed during runtime to selectively control the at least one IoT device during the interactive experience. The program of behaviors of the interactive experience may be debugged and played back via a debugging and playback user interface of the AR device.

The AR device for generating interactive experiences described herein may include a runtime module that determines a type of AR user interface widget or graphical representation to render for the at least one IoT device on a display of the AR device, that receives a selection of the at least one IoT device to be controlled by the AR device during the interactive experience, and that provides the determined AR user interface widget or graphical representation for the selected at least one IoT device to the display as an overlay. An experience generation user interface provides a visual programming interface through which a user programs the interactive experience by generating a program of behaviors of the selected at least one IoT device using at least one of logic gates or control circuits connected to the selected at least one IoT device in the visual programming interface. The logic gates and control circuits together specify the behaviors to be performed by the IoT device. Upon completion, the runtime module executes the program of behaviors in a runtime module to selectively control the at least one IoT device during the interactive experience programmed by the user.

In sample configurations, the experience generation user interface is a builder component that includes user interface components including at least one of (a) an IoT device user interface for interacting with the at least one IoT device to attach logic gates or control circuits to the inputs or outputs of the at least one IoT device; (b) a logic gate/control circuit user interface that provides access to logic gates for programming behaviors based on input/output rules of the IoT devices that can be represented via Boolean logic, arithmetic functions, or any other n-ary mappings or operations that are definable mathematically and to control circuits to express functions including at least one of a threshold, a clamping function, or an oscillator; or (c) a sequencer user interface for defining a sequence of actions to be performed by the at least one IoT device as part of the interactive experience.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The confluence of connected IoT and AR devices in households and commercial spaces provides vast opportunities for the generation of novel experiences in environments referred to herein as "smart" spaces. Smart spaces combine real-world and virtual elements by fusing artificially-displayed AR content with IoT device outputs and through interactions with real-world connected IoT devices. However, orchestrating such amalgamations of AR devices, virtual content and physical output (visual, audible, tactile) of IoT devices is a technical challenge.

Known systems do not address the use of AR and spatial user interfaces to facilitate the generation of interactive experiences in smart spaces that is based on a native AR user interface as described herein. Examples of AR interactive experiences as described herein range from "hide and seek" games for kids in a home, interactive museum exhibits, or large and complex scenarios such as theme park rides or AR escape rooms with IoT device controls where multiple users may share a space and manipulate IoT devices to make desired adjustments to the environment.

The systems and methods described herein include a set of user interfaces that enable such systems and methods to function effectively for its users. A native AR system is used as it provides a number of advantages. For example, a native AR system enables a user to view the results of their work immediately since an additional abstraction layer, e.g., a desktop-based editor or integrated development environment, is not required. Also, the spatial layout of all components and consequently their connections and any logic is immediately apparent as being co-located in the smart space, therefore interpreting a visualization of the smart space is not necessary. Since IoT devices can be directly interacted with, adjustments to the experience can be made on-the-fly in the right location for viewing the experience. Native AR systems also enable multiple users to generate a smart space collaboratively in the same environment.

AR devices are spatially aware, and IoT devices are usually distributed in a user's space. These features make it possible to select and manipulate a particular IoT device in AR by pointing to the IoT device's location in space, rather than selecting it from a (potentially long) list of available devices in two-dimensions. IoT devices may have an extended set of inputs, or multi-dimensional inputs. Spatial interaction using AR has the potential to extend beyond the mobile device's screen while still being understandable and navigable by the user. Also, spatial input modalities such as hand gestures are useful for inputting multi-dimensional variables (e.g., RGB color selection), in comparison with the options provided by a 2D touch screen.

To take advantage of these features, a tool is provided that enables the generation of AR interactive experiences with IoT devices for users of AR devices in a native AR environment by using input techniques native to AR (e.g., gesturing). The architectural design and specification of the necessary components and their interoperation as described below may be used to generate interactive experiences in smart spaces. The architectural design may further include direct logic gate attachment, gateway nodes and device proxies that facilitate development of interactive experiences in large three-dimensional (3D) AR environments without cluttering the 3D AR environment.

Reference now is made in detail to the examples illustrated in the accompanying FIGS. 1-10 and discussed below.

The system includes one or more IoT devices, one or more AR devices, and a backend server including a registration module and a runtime module that includes program modules. The backend server also performs state update and logic evaluation and dispatches commands. It will be appreciated that the backend server may run on a separate machine or as an application programming interface (API) or system layer on an operating system of any of the one or more AR devices. In sample configurations, the system further includes an experience generation user interface (UI) on the AR devices that interfaces the AR devices with an IoT device UI that is, in turn, interfaced with direct control widgets, input and output ports of the IoT devices, and is directly attached to logic and program flow circuits. In other configurations, the system further includes a logic gate UI, a sequencer UI, a connector mechanism and visualization element, and IoT device proxies. The system may further include a debugging and playback UI that provides the user with the ability to debug generated experiences and to play back the generated experiences.

FIG. 1 is a general block diagram of a system 100 for interfacing augmented reality (AR) camera devices to Internet of Things (IoT) devices in sample configurations. As illustrated, a plurality of AR camera devices 1101 through 110N, such as Snapchat cameras adapted to include a messaging app such as SNAPCHAT® available from Snap, Inc. of Santa Monica, California, include AR displays 1201 through 120N, respectively, for displaying AR objects. The AR camera devices 110 may include a smartphone, a laptop, a desktop, an electronic eyewear device, a heads up display, or any other computing device that enables communications via the internet. The AR camera devices 1101 through 110N may be further adapted to include software 1301 through 130N to support features such as hand and body identification and tracking, marker tracking in AR space, and the like. Such features are readily available in messaging apps such as the aforementioned SNAPCHAT® messaging app.

The respective AR camera devices 1101 through 110N may share a common AR widget user interface 140 in some examples. The AR widget user interface 140 may implement user interface widgets for interacting with the IoT devices 110 in sample configurations. The AR widget UI 140 is available as a widget API layered in between AR applications and the operating system of the AR device 110. It will be appreciated that the AR widget and related object recognition services also may be performed by the software 1301 through 130N running on each AR camera device 1101 through 110N in sample configurations and that the common AR widget user interface 140 may be provided separately for each AR camera device 110 in sample configurations. More details about the AR widget user interface 140 may be found in the afore-mentioned related application.

As will be explained in more detail with respect to FIG. 2, the backend server 150 acts as a bridge between the AR cameras devices 110 and the physical IoT devices 160. The backend server 150 also may send commands to the IoT devices 160 to act in any number of ways supported by the respective IoT devices 160. The IoT devices 160 may be controlled to perform desired physical actions 180 in response to user interaction with the AR camera devices 1101 through 110N and to provide sensor outputs that initiate one or two-way interactions with the AR camera devices 1101 through 110N. Such two-way interactions may include the transfer of status information from the IoT devices 160 to respective AR camera devices 110. The backend server 150 also may be responsive to context information provided by other context servers 170. Such context information may include time of day, weather conditions, global positioning system (GPS) data, and any other information available from third party servers. As noted above, the backend server 150 may run on a separate machine or as an application programming interface (API) or system layer on an operating system of any of the AR camera devices 1101 through 110N.

Figure 2:
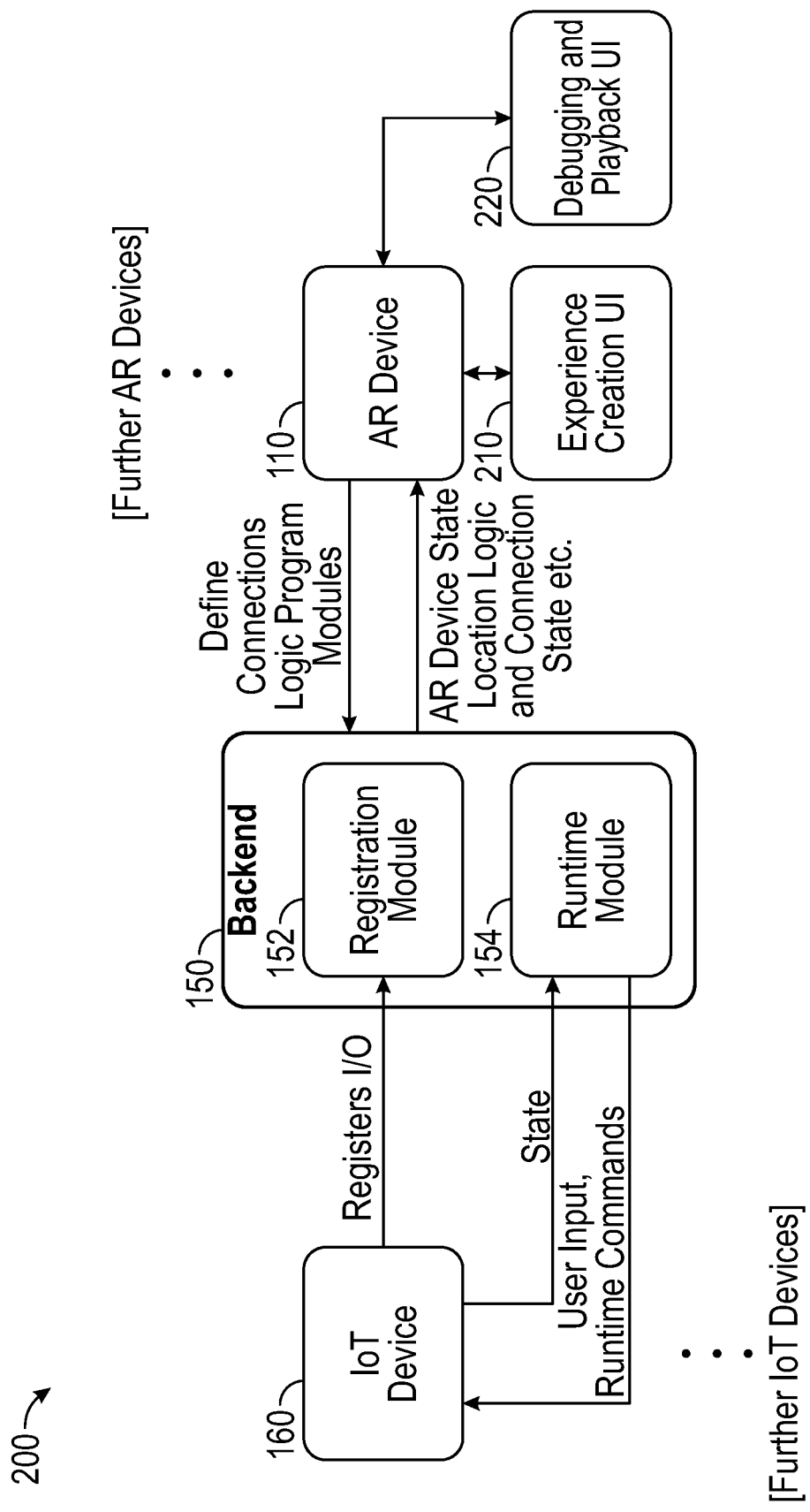
FIG. 2 is a block diagram of the components and information flow of the system of FIG. 1 in a sample configuration.

FIG. 2 is a block diagram of the components and information flow of the system 100 of FIG. 1 in a sample configuration. As illustrated, the system 200 includes IoT device(s) 160, AR device(s) 110, backend server 150, an experience generation user interface 210, and a debugging and playback user interface 220. As described further below, system 200 enables users of AR devices to generate immersive and interactive experiences in "smart" spaces.

Generating immersive and interactive experiences in "smart" spaces involves programming specific behaviors of one or more IoT devices 160 in a space in the native AR programming environment. The IoT devices 160 may be any available connected smart device known in the art. For example, the IoT devices 160 may include common household devices or semi-professional devices that an end user might find at home or in commercial spaces, e.g., RGB smart lamps, thermostats, smart speakers, smart switches, and the like. It will be appreciated by those skilled in the art that such IoT devices may be adapted to work in the system described herein so long as such device provides connectivity to the AR device 110 and backend server 150 via WI-FI®, BLUETOOTH®, or other communications channels that enable Internet access, and the IoT device also provides active or passive localization in the environment that can be received by the AR device 110. Active localization may be accomplished by radiofrequency (RF) beaconing, ultrasound, visual light signaling, or via a Global Positioning System (GPS) for outdoor applications. On the other hand, passive localization may be accomplished by saving the fixed location of the IoT devices 160 in the memory of the backend server 150 or AR device 110 or through a visual code near the IoT device 160 for selection or some other fiduciary that can be recognized by the AR device 110. The AR device 110 and the IoT device 160 also may conduct limited duplex communications to convert user input into the AR device 110 into a display of an AR user interface widget appropriate for the IoT device 160. The IoT devices 160 also may provide information about their state to external devices via a suitable endpoint.

The AR devices 110 are used both for generation and for experiencing generated interactive experiences. Suitable AR devices 110 include, but are not limited to, smartphones, tablets, or wearable devices such as smart glasses. In sample configurations, the AR device 110 provides connectivity with the backend server 150 or directly with IoT devices 160 via a communication channel that enables Internet access (e.g., WI-FI®, BLUETOOTH®, etc.) for sending and receiving messages and also provides inside-out or outside-in localization capability. In one example, the localization capability of the AR device 110 generates a relative pose (position, orientation) between the AR device 110 and any IoT devices 160 to be used in an interactive experience. Also, in addition to standard input modalities (e.g., touch screens, buttons, trackpads, voice, etc.), the AR device 110 may support inputs such as hand gesture or body gesture tracking.

As shown in FIG. 2, the backend server 150 includes two main modules, a registration module 152 and a runtime module 154. The registration module 152 registers the available command inputs and state outputs of the IoT devices 160 that are exposed for interaction with the AR devices 110. The IoT devices 160 may broadcast their presence to the backend server 150 upon power up to initiate the registration process. During the registration process, the IoT devices 160 provide a listing of their available command inputs and state inputs to the registration module 152. Conversely, the backend server 150 may periodically poll for new IoT devices 160. Also, the inputs and outputs for AR user interface widgets to be used for the respective IoT devices 160 can be specified during the registration process. The AR user interface widgets may be defined using a standardized schema, such as the following example JSON file showing a minimal configuration for controlling a smart light:

```
{
    "deviceUUID": "bd1b12ffcdf38f4e80b2ccd7d3660548",
    "deviceName": "Office Smart Light",
```

-continued

```
    "inputs": [
        {
            "name": "color",
            "type": "HSVPicker",
            "endpointURL": "http://10.0.0.36/lightControl"
        },
        {
            "name": "powerSwitch",
            "type": "boolean",
            "behavior": "latch"
        }
    ],
    "Outputs" :[
        {"name":"currentColor",
        "endpointURL": "http://10.0.0.36/lightStatus"}
    ]
}
```

Similarly, the AR devices 110 may use the registration module 152 to register with the backend server 150 and signal their readiness to receive updates from IoT devices 160 and also to register their ability to send commands to the backend server 150 or the IoT devices 160 directly. The AR devices 110 may also send their current location to the backend server 150 as well as updates, which may coordinate certain updates between the IoT devices 160 and the AR devices 110 (e.g., start sending a specific state to the AR device 110 or activating a certain input AR widget user interface (UI) 140 on the AR devices 110). However, certain parts of such logic could also run on the AR devices 110 locally.

The runtime module 154 executes program logic to play back the interactive experience (IE) program generated by the user that represents the interactive experience. The runtime module 154 may implement the IE program using one or more IE program modules that control a portion of the user experience. The IE program modules may maintain an internal state that is updated by a state update and logic evaluation component that divides IE program execution into discrete time steps. In each time step, the state update and logic evaluation component analyzes each IE program module and updates its state based on external inputs and its previous state, as well as sets a new output state (if available). If new output states result from a state update, and this requires commands to be sent to an IoT device 160, these commands will be queued and later dispatched via a command dispatch component. The command dispatch component uses information from the registration module 152 to dispatch commands to the IoT devices 160 and to update the representation of the state of the IoT devices 160 in the IE program modules making use of the state information. In some configurations, the IoT devices 160 may push out a preferred AR overlay for interacting with the IoT device 160 that is communicated to the AR devices 110 by the runtime module 154.

It will be appreciated that the backend server 150 may run on a separate machine, or as a further API or system layer on the AR device operating system of the AR device 110 itself.

Figure 3:
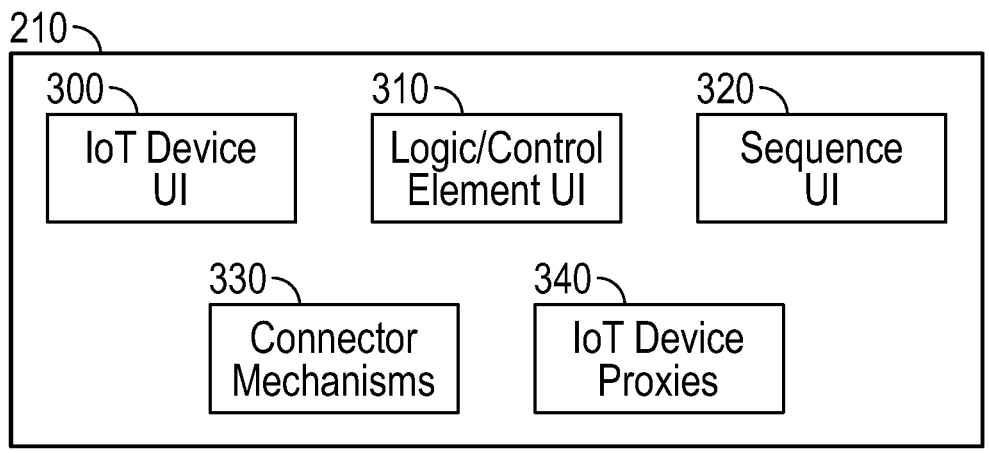
FIG. 3 is a block diagram illustrating components of the experience generation user interface of FIG. 2 in a sample configuration.

The experience generation user interface (UI) 210 is used by users to build interactive experiences in sample configurations. As illustrated in FIG. 3, the experience generation UI 210 is a builder component that includes user interface components including at least IoT device UI 300, logic gate/control circuit UI 310, and sequencer UI 320, as well as connector mechanisms 330 and IoT device proxies 340 that are virtual representations of an IoT device 160 at a remote location. The user may select each of these builder components of the experience generation UI 210 and use the builder components as tools in a visual programming interface to build the respective features of the interactive experience to be implemented during runtime. Each of these components will be described in more detail below.

The IoT device UI 300 may be used by the users to interact directly with the IoT device 160 (e.g., in case the user wants to try out a setting directly) and also to attach input and output connections or logic gates. The IoT device UI 300 is a builder component that enables the user to implement a number of features including direct control widgets, input ports, output ports, and may further provide direct attachment of logic gates and IE program flow circuits. In sample configurations, the IoT device UI 300 is shown on the user's AR device 110 when the user moves into the vicinity (or "interactive zone") of an IoT device 160, or when the user is working with an IoT device proxy 340 of an IoT device 160 at a remote location.

In sample configurations, direct control widgets may be used to directly set any properties exposed by IoT devices 160 using input/output connectors for corresponding logic devices. Direct control widgets may be a custom per-device UI or generated generically by registering the input variable types of the IoT device 160 with the registration module 152, as described in the afore-mentioned related application. Such connectors and devices may be presented to the AR display of the user through operation of spatially situated visual programming tools such as Ivy, which uses immersive virtual reality to generate logical program constructs, establish logical links between smart objects, and visualize real-time data flows between real-world sensors and actuators. Spatially situated visual programming tools such as Ivy use 2D visual programming environments such as CHIMP, CaveCAD, Scratch, Alice, WoTKit, Wyliodrin and Node-RED to provide the needed graphical tools to help the users understand the logical connections between objects. Visual representations are also available in numerous professional tools such as Lab View, SimuLink, Max, and Grasshopper for Rhino. A Reality Editor may be used for spatial situation visual programming that enables authoring of basic connections between smart objects using AR on handheld devices. It will also be appreciated that the visual and spatial programming system described by Cao, et al. may be adapted as a visual programming interface to program the IoT devices 160 as described herein.

In order to receive control commands from other components, graphical AR representations of IoT devices 160 may have input ports that can be connected to other IoT devices 160 or logic gates. Upon each state update of the runtime module 154, all input values may be updated according to the defined program flow or program logic.

Some IoT devices 160 may expose states (e.g., readings from smart air quality sensors, smart thermometers, and the like) that may serve as inputs for other parts of the experience. Therefore, output ports may be present that can be connected to input ports of other IoT devices 160 or logic gates or program flow circuits. Upon each state update of the runtime module 154, all output values may be updated according to changes of the state of the particular IoT device 160.

In order to reduce clutter in the display of the AR device 110, which is especially important when working in a 3D environment, certain logic gates and program flow circuits may be attached directly to input ports of IoT devices 160 via their output ports, in a sense "piggy-backing" onto them. Such "piggy-backing" reduces the requirement for the user to generate extra connections between logic gates and program flow circuits to the inputs of IoT devices 160. Similarly, inputs of logic gates and program flow circuits may be attached directly to outputs of IoT devices 160, with the same goal of reducing the number of connections to be drawn by the user. Direct attachments also may be stacked to build complex, custom components.

Figure 4A:
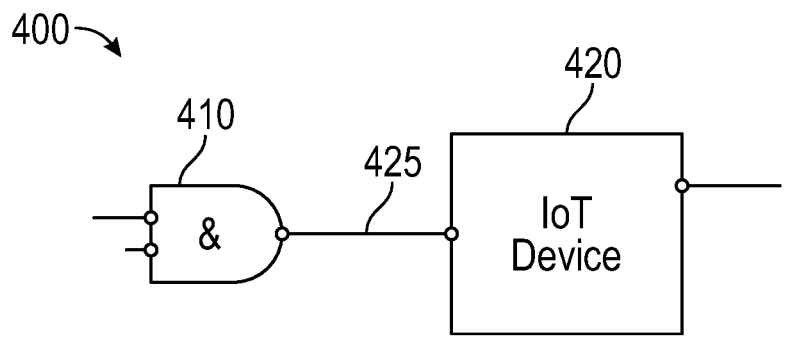
FIG. 4A is a diagram of a two-dimensional (2D) representation of attachment of a control widget to an IoT device to generate complex, custom components in a sample configuration.

For example, FIG. 4A is a diagram of a two-dimensional (2D) representation 400 of attachment of a control widget 410 to a graphical representation 420 of an IoT device 160 using a connection line 425. Multiple such control widgets 410 indicative of logic and control circuits may be connected to the graphical representation 420 of the IoT device 160 to assemble logic circuits specifying the operation of the IoT device 160. The resulting logic circuits may be simple or complex. The control widgets 410 may be so combined to generate custom components in a sample configuration. In this example, the control widget 410 is a logic gate in the form of a conventional AND gate and the IoT device 160 is assumed to be a light switch. The graphical representation 420 virtually represents the light switch in AR space. In this configuration, the light switch (IoT device 160) is turned ON or OFF in response to the output of the AND gate control widget 410, which provides ON or OFF signals in response to its respective inputs.

Figure 4B:
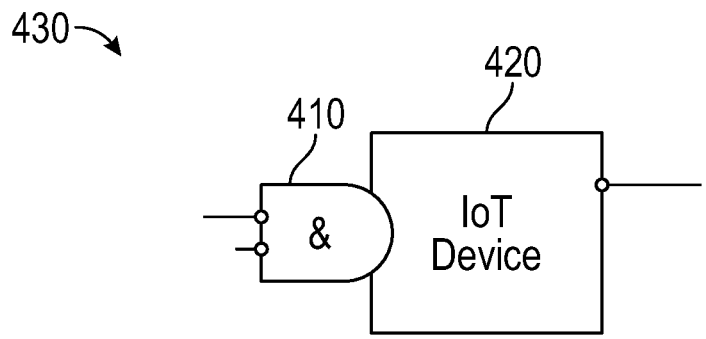
FIG. 4B is a diagram of a 2D representation of direct attachment of a control widget to an IoT device to generate complex, custom components in a sample configuration.

FIG. 4B is a diagram of a 2D representation 430 of direct attachment of a control widget 410 to a graphical representation 420 of an IoT device 160 without connection line 425. In this example, the control widget 410 is again a logic gate in the form of a conventional AND gate. However, in this example, the control widget 410 is attached directly to an input port of the graphical representation 420 of the IoT device 160 without connection line 425. This configuration enables the user to generate stackable, complex, custom components without drawing extra connections (e.g., by eliminating connection lines 425 between components), thereby reducing the clutter on the display of the AR device 110 that may otherwise be caused by the generation of such components.

It will be appreciated that the custom components illustrated in FIGS. 4A and 4B may be displayed as AR objects on the display of the AR device 110 as opposed to a desktop computer and may be generated in the 3D AR domain as the user moves throughout the real-world domain.

With reference back to FIG. 3, the logic gate/control circuit UI 310 provides access to logic gates that enable the user to program behaviors based on input/output rules of the IoT devices 160 that can be represented via Boolean logic, arithmetic functions, or any other n-ary mappings or operations that are definable mathematically. Control circuits may be used to express more complex functions, such as thresholds, clamping functions or even oscillators. The designs of such elements for an AR interface require careful consideration to make them as useful as possible. In their simplest form, logic gates and simple functions may be rendered as 3D boxes with suitable attachment points for input and output connections. A symbol on the front of the 3D boxes may be used to describe their behavior (e.g., AND). However, more complex control circuits, e.g., a threshold, may have their own user interface to enable the user to input the desired control value in a pre-established numeric range. This can be accomplished, e.g., by using standardized AR user interface widgets of the type described in the afore-mentioned related application, e.g., a slider or dial to input the value and a display that shows the selected value.

Depending on the input/output capabilities of the AR devices 110, user interactions with control circuits may be very realistic, e.g., employing force feedback using a haptic device to give a visceral feeling of sliding a slider or turning a notched dial.

In some cases, the user may define a sequence of actions to be performed by an IoT device 160 as part of an interactive experience, e.g., flashing a light in a specific color sequence and playing a sound at the end. To store such a sequence (essentially a sequence of device states), a special programming circuit called the sequencer is provided that can store a sequence of states from one or more IoT devices 160 on a timeline. The sequencer UI 320 provides access by the user to the sequencer programming circuit.

Figure 5:
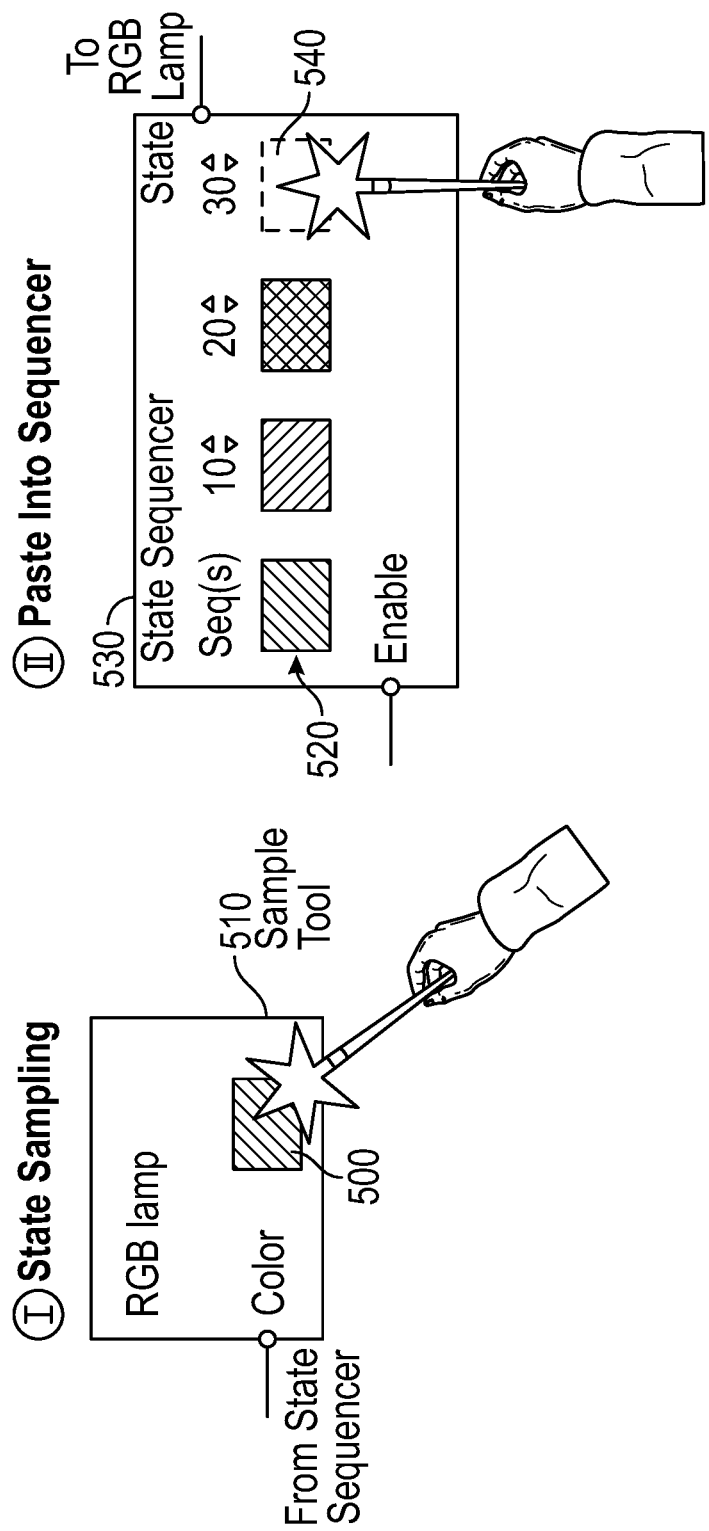
FIG. 5 is a diagram depicting sampling a state of an IoT device and pasting the sampled state into a sequencer component in a sample configuration.

Inputting and representing states within the sequencer can be a challenge, especially in an AR context. As shown in FIG. 5, one possible solution to this challenge is for the sequencer UI 320 of a sequencer component to expose a "sample" tool by which a user can sample the state of an IoT device 160 by moving into its vicinity and then applying the tool. The tool then carries this state over to a representation (at minimum a text value, e.g., RGB (255,0,255) for a smart lightbulb) on the state sequencer 530. The user is then able to move around or copy and reuse this state on the sequencer timeline when building a sequence for their project.

For example, FIG. 5 is a diagram depicting sampling a state of an IoT device 160 and pasting the sampled state into a sequencer component 530. In the example of FIG. 5, the state sequencer 530 may provide an RGB lamp color 500 that the user may sample by touching the color with a virtual sample selection device 510, such as a wand. The user may paste the selected color into a state sequence 520 of the state sequencer 530 by touching the virtual sample selection device 510 to the next state 540 in the sequence 520. The output of the sequencer 530 in this example may be provided to an RGB lamp to sequence through the lamp colors in the specified sequence. In this fashion, the user may use displayed AR objects to control the sequence of colors and timing of the display of the colors by an IoT enabled RGB lamp.

Connector mechanisms 330 of the experience generation UI 210 include building blocks (IoT devices, logic gates, sequencers, etc.) of interactive experiences that have input and output connectors to connect to the building blocks in order to specify program logic and information flow. Standard connectors used in existing visual programming environments use "wires" or "pipes" to connect components, which is straightforward to also realize in AR. However, in addition to "wires" or "pipes" to connect components, some examples may further include gateway nodes (FIG. 6) and connectors that model in AR the corresponding physical counterparts.

In sample configurations, gateway nodes may be used to extend smart spaces across large areas or volumes to connect distant components with each other while minimizing visual clutter on the AR display 120 of the AR device 110. The gateway nodes are set up to logically connect two distant locations without the need for dragging a wire across the entire distance. Gateway nodes may have one or more connections and ensure that connections are properly labeled so that it is easy for the user to extend the connection at the remote end.

Figure 6:
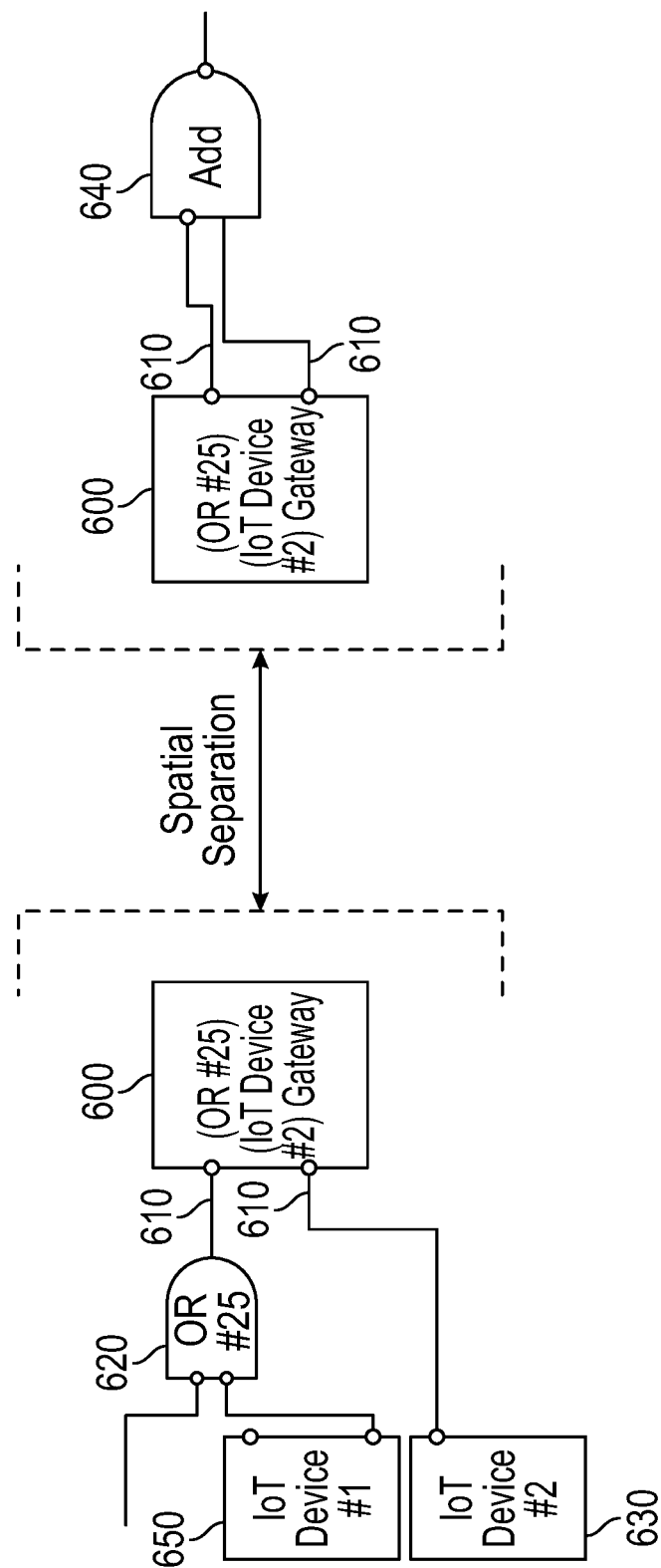
FIG. 6 is a diagram depicting a 2D example of a gateway node forwarding connections between spatially separated components in a sample configuration.

FIG. 6 is a diagram depicting a 2D example of a gateway node 600 forwarding connections between spatially separated Boolean components in a sample configuration. As illustrated, gateway nodes 600 are physically separated elements that collect inputs in order to avoid extending the connections 610 across the display of the AR device 110. In this example, the gateway nodes 600 are labeled as OR #25 and IoT Device #2 as these are the elements 620 and 630 for which the connections 610 are extended by the gateway nodes 600 to connect to the AND gate 640. As illustrated, there may be a number of elements to the left of the OR gate 620, such as IoT device #1 (element 650). As an example, the configuration of FIG. 6 may be used to pipe an audio stream from an IoT device 160 in one room to an IoT device 160 in another room that is not within the field of view of the AR device 110.

Assuming the availability of very high-fidelity AR devices in terms of graphics, audio, and haptic feedback, the connectors may be modeled very realistically to correspond to their physical counterparts. For example, the connectors may represent the connector's visual shape, sound and feeling to provide a realistic "snap" as the connection is established during creation of the interactive experience. For instance, the connector may model the plugging behavior of a 3.5 mm audio jack or an RJ45 connector. Also, based on the data type that is being connected, specific audiovisual or haptic features may be provided. Also, virtual "resistance" may be added if the user attempts an invalid connection.

Figure 7:
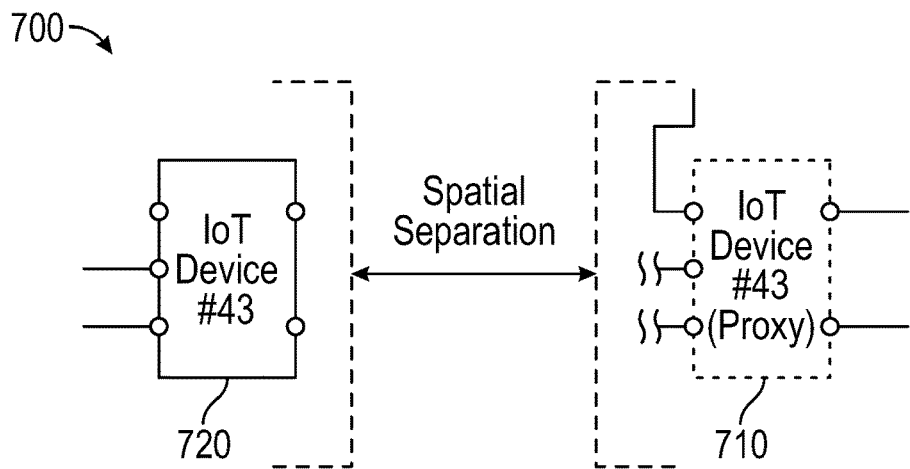
FIG. 7 is a diagram depicting a 2D example of an IoT device proxy that forwards connections between the actual device (left) and a proxy representation of the actual device at a spatially separated location in a sample configuration.

As noted above with respect to gateway nodes 600, it may be inconvenient to generate connections to IoT devices 160 that are at a significant distance from the component with which the user desires to make a connection. For example, FIG. 7 is a diagram 700 depicting a 2D example of an IoT device proxy 710 selected from the IoT device proxies 340 that forwards connections between the actual device 720 (left) and an IoT device proxy 710 representing the actual device 720 at a spatially separated location. The IoT device proxy 710 provides a proxy of the actual device so as to expose inputs and outputs to enable the user to generate a virtual representation of a single or a group of IoT devices 160 and to copy and paste the IoT device proxy 710 of the actual device 720 at a different location with the goal of simplifying the process of making connections.

The debugging and playback UI 220 for generated experiences enables the user to play, pause, or reset execution of the generated experience once the user has finished generation of an interactive experience. Debugging information may be displayed next to components to interpret their state, or even modify the state at runtime. Also, a debug mode enables the user to pause and step through the experience and to visually inspect the state of individual components and the data currently transmitted/received via outputs/inputs, respectively. For example, the display of the AR device 110 may display Boolean values and the like during playback of the generated experience.

Figure 8:
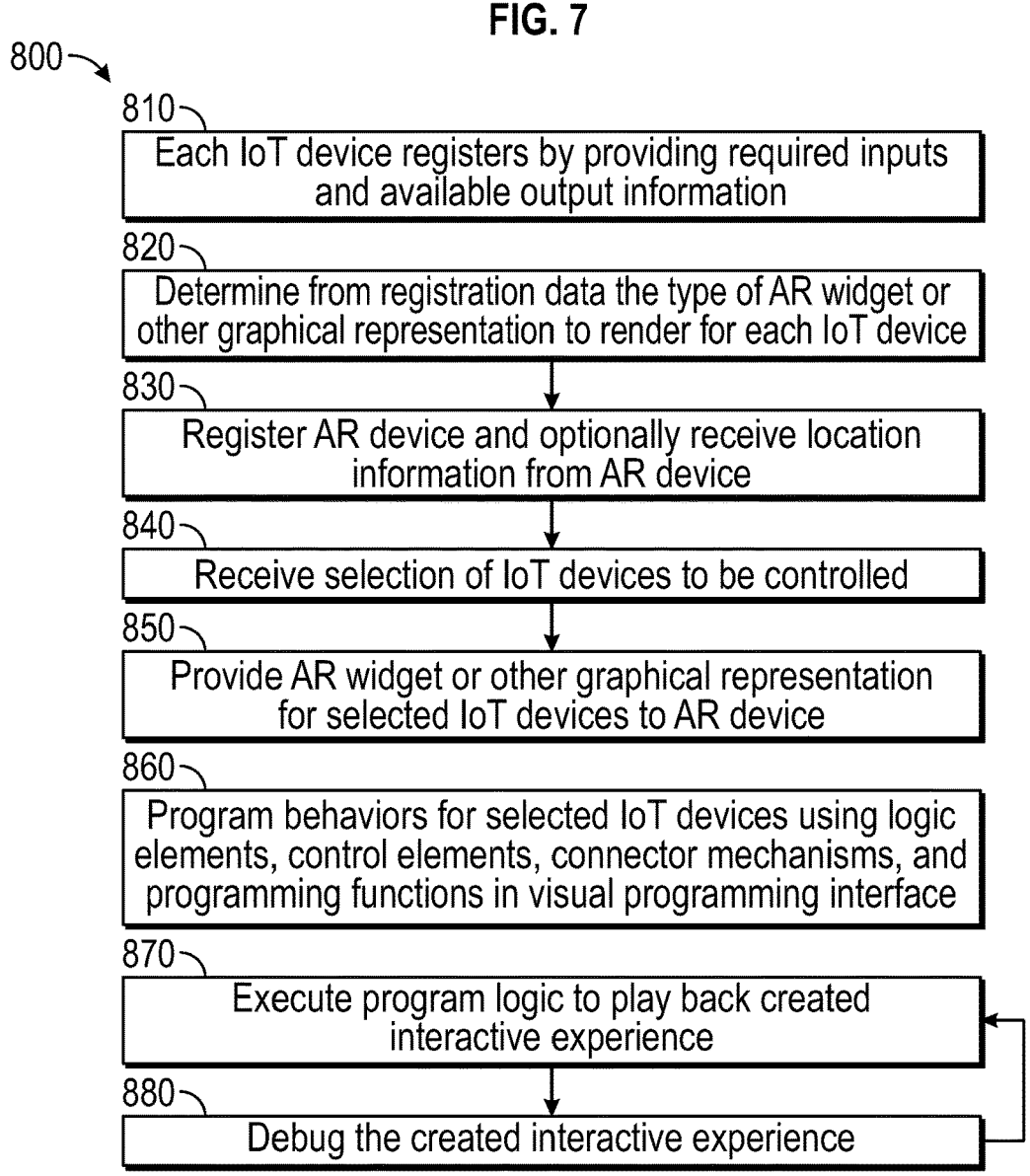
FIG. 8 is a flow chart of a method for producing immersive and interactive experiences using augmented reality (AR) devices in smart spaces having a plurality of IoT devices in a sample configuration.

FIG. 8 is a flow chart of a method 800 for generating immersive and interactive experiences using AR devices 110 in smart spaces having a plurality of IoT devices 160 in a sample configuration. The method 800 may be implemented by the server 150 (FIG. 2) alone, by an AR device 110 that implements the server functions, or by a combination of the server 150 and one or more AR devices 110.

As illustrated in FIG. 8, the method 800 includes each IoT device 160 registering with the server 150 by providing its device inputs and available output information at 810. For example, the registration information may be provided using standardized schema as described in the afore-mentioned related application. At 820, the server 150 determines from the registration data provided by the IoT device 160 the type of AR widget or other graphical representation to render for each IoT device 160. This information may be stored in a table on the server 150 or in the AR device 110. The AR device 110 is also registered at 830. Location information for the AR device 110 is also optionally obtained at 830.

To program the interactive experience, the user provides to the server 150 at 840 a selection of the IoT devices 160 to be controlled by the AR device 110 during the interactive experience. The selection may be automatic (e.g., based on proximity of the AR device 110 to the IoT device 160) or may be made by the user based on verbal input from the user, orientation of the AR device 110 toward the IoT device 160, and the like. At 850, the AR widget or other graphical representation for the selected IoT device 160 is provided to the AR device 110 as an overlay on the display of the AR device 110. The AR widget or other graphical overlay may automatically appear or may be selected by the user. Once the AR widget or other graphical representation has been displayed to the user, the user may program behaviors for the selected IoT devices 160 at 860.

For example, as described above, the user may use the logic gate/control circuit UI 310 at 860 to access graphical logic gates that enable the user to program behaviors based on input/output rules that can be represented via Boolean logic, arithmetic functions, or any other n-ary mappings or operations that are definable mathematically. Control circuits may be selected to express more complex functions, such as thresholds, clamping functions or even oscillators. The logic gates and simple functions may be rendered as 3D boxes with suitable attachment points for input and output connections to other components and IoT devices 160. A symbol on the front of the 3D boxes may be used to describe their behavior (e.g., AND). Depending on the input/output capabilities of the AR devices 110, user interactions with control circuits may employ force feedback using a haptic device to give a visceral feeling of sliding a slider or turning a notched dial. The user also may use the sequencer UI 320 to access a sequencer to define a sequence of actions to be performed by an IoT device 160 as part of the desired interactive experience. The user may also use connector mechanisms 330 of the experience generation UI 210 to connect the building blocks (IoT devices, logic gates, sequencers, etc.) of the interactive experience in order to specify program logic and information flow. As noted above, standard connectors may include "wires" or "pipes" to connect components. However, more sophisticated connectors such as gateway nodes 600 and connectors that model in AR the corresponding physical counterparts also may be used to generate the interactive experience.

Once the desired interactive experience has been programmed at 860 through the visual programming interface and the appropriate placement of the logic components, the runtime module 154 executes the resulting program logic at 870 to play back the "program" generated by the user that represents the interactive experience. Program modules of the runtime module 154 may maintain the internal state that is updated by state update and logic evaluation components that divide program execution into discrete time steps. In each time step, the state update and logic evaluation component analyzes each program module and updates its state based on external inputs and its previous state and also sets a new output state (if available). If new output states result from a state update, and this requires commands to be sent to an IoT device 160, these commands may be queued and later dispatched via a command dispatch component as previously mentioned.

As desired, the user may debug and playback the generated interactive experience via the debugging and playback UI 220 at 880. Once the debugging is completed, the interactive experience is ready for playback to control the respective IoT devices 160 in the smart space based on the execution by the runtime module 154 of the program(s) generated by the user on the user's AR device 110.

In one use-case example, a user is an avid fan of escape rooms and is currently generating his own AR-augmented escape room experience. This experience combines virtual objects shown on a head-worn AR device 110 with user interactions with real-world smart devices (e.g., actuators, lights, speakers, etc.) that are connected to the AR device 110 via the backend server 150. The user uses the AR system 200 of FIG. 2 to generate and run his escape room experience, which currently comprises two rooms connected by a short corridor. The current experience the user is working on is a science fiction scenario where the user has to escape from the brig (room #1) of a deserted starship and regain control of the ship on its bridge (room #2). In the experience, the brig and bridge are connected via a "turbolift."

The user is currently working on a portion of the experience where the user has just escaped from the brig and is using the turbolift to travel to the bridge. The turbolift is realized as a pair of powered sliding doors at either end of a short corridor separating rooms #1 and #2. To simulate turbolift travel during the experience, the turbolift is equipped with IoT devices 160 including two powered sliding doors (brig/bridge), a speaker system, a controllable LED strip (4 LEDs) on the left side of the sliding doors (to simulate passing decks while traveling on the lift), a control display indicating the current deck, and a "viewport" on which AR content of the ship's experience gets overlaid.

The user is wearing smart glasses as the AR device 110 and is using the AR system 200 directly in the escape room space to implement the turbolift portion of the experience. The turbolift portion of the experience may be implemented as follows.

The "turbolift" ride begins once the user has managed to solve all puzzles in the brig and manages to open the turbolift door. Once the player enters the lift space and presses "bridge" on the turbolift's control panel, the "turbolift travel" program sequence starts. The user implements this with a simple "if" gate that checks for successful completion of the brig portion and the button press, then starts a sequencer module to which it is connected. To do this, the user goes into the "turbolift" area, instantiates a sequencer module, and drags connections to it from the brig door, bridge door, speaker system, LED strip, display, and AR viewport. Sequencer rows corresponding to the devices are automatically populated. The user may manually add columns corresponding to certain timestamps (e.g., 0 sec, 5 sec, 10 sec, 15 sec, 20 sec, 25 sec) and define actions for each of the devices connected to the sequencer. Each device provides the sequencer with the appropriate metadata for the types of actions selectable by the user in the sequencer column (e.g., the LED strip supports "off", "cycle slow" and "cycle fast" actions). The user sets the sequencer up as shown in Table 1 to simulate an AR-augmented "turbolift" ride.

TABLE 1

| Device | 0 sec | 5 sec | 10 sec | 15 sec | 20 sec | 25 sec |
|---|---|---|---|---|---|---|
| Brig door | close | — | — | — | — | — |
| Bridge door | — | — | — | — | — | open |
| Speaker sound | Lift departing | Lift accelerating | Lift traveling | Lift traveling | Lift decelerating | "Bridge D" voice announcement |
| LEDs | off | Cycle slow | Cycle fast | Cycle fast | Cycle slow | off |
| AR viewport (3D animation mixer) | Brig exterior | Travel brig-bridge: departing brig area | Ship exterior: travel brig-bridge | Ship exterior: travel brig-bridge | Travel brig-bridge: arriving at bridge area | Bridge exterior |
| Control Panel Deck indication | 5 (=Brig deck) | 6 | 8 | 10 | 11 | 12 (=Bridge) |

The sequencer thus implements the steps of closing the door (0 sec), the lift departing the brig area and accelerating (5 s), the lift coasting along the outside of the ship (10 s, 15 s), the lift arriving at the bridge (20 s), and opening the bridge door (25 s). The IoT enabled doors providing physical access, IoT enabled speaker providing the lift motion and ambient sounds, the IoT enabled LEDs providing a simulation of lift motion and decks passing by, the IoT enabled AR viewport providing lift travel animations and images of the ship's exterior, and the IoT enabled control panel (sci-fi-UI) all work together to give the user the illusion of traveling on a turbolift. Once the sequencer has been established, the user connects the sequencer's "Completed" output to the "Start" input of the module that launches the bridge part of the escape room experience.

Of course, many other IoT and AR enabled interactive experiences may be established by combining the IoT devices 160 and AR devices 110 using the connector mechanisms 330 and IoT device proxies 340 with a sequencer establishing the experiences based on the logic and control protocols established by the user using the AR system 200 described herein.

System Configuration

Figure 9:
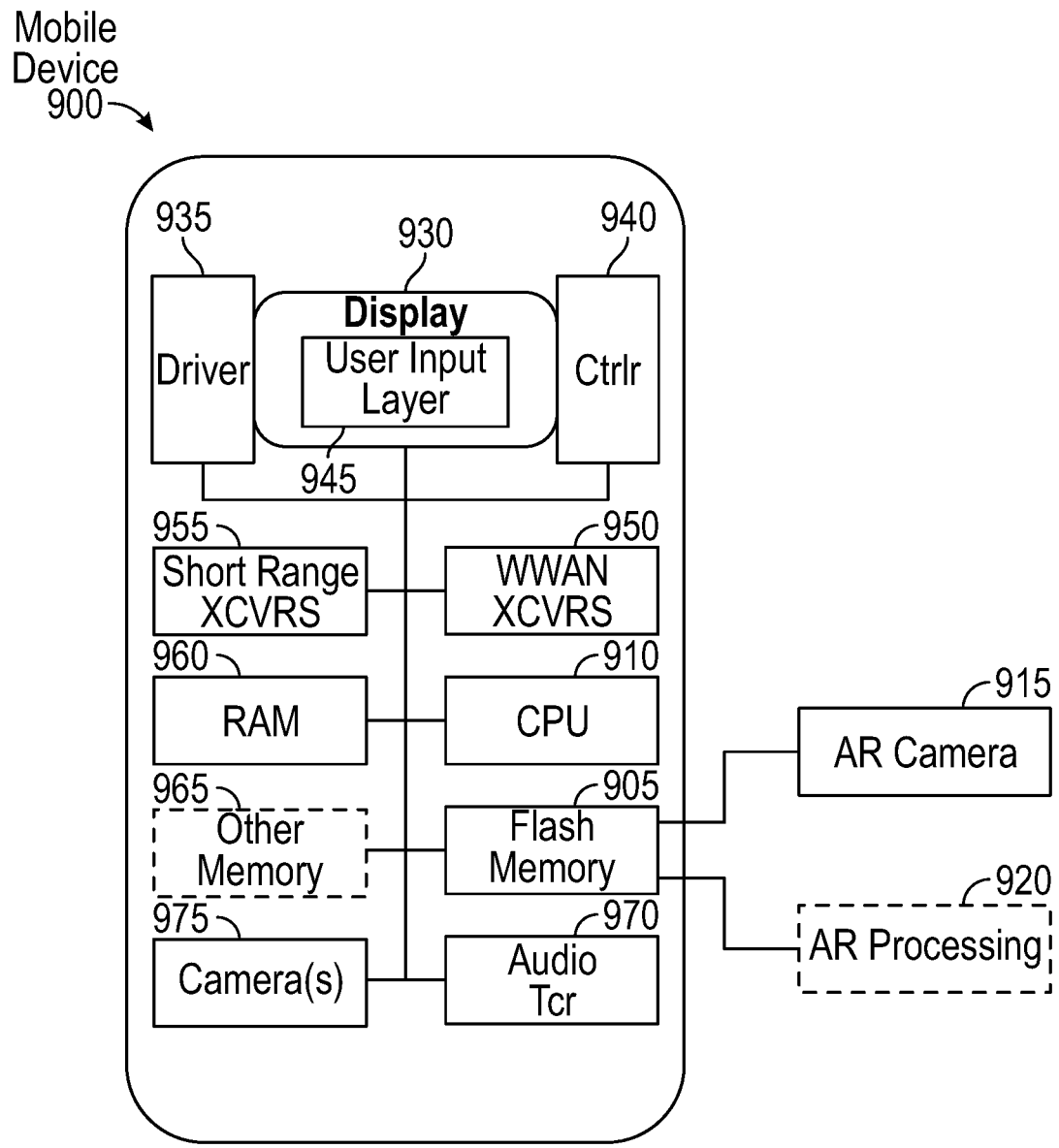
FIG. 9 is a block diagram illustrating a sample configuration of a mobile phone adapted to operate as an AR camera device in sample configurations.

FIG. 9 illustrates a sample configuration of a mobile device 900 adapted to interface an AR camera device 110 with IoT devices 160 in sample configurations. In particular, FIG. 9 is a high-level functional block diagram of an example mobile device 900 that a user may use as the AR camera devices 110 described herein. Mobile device 900 may include a flash memory 905 that stores programming to be executed by the CPU 910 to perform all or a subset of the functions described herein. For example, the flash memory may store AR camera software 915 and optionally may contain AR processing software 920 for execution by CPU 910 to enable the user of the mobile device 900 to display and interact with AR objects presented by the AR camera device 110 as described herein. The mobile device 900 may further include a camera 975 that comprises one or more visible-light cameras (first and second visible-light cameras with overlapping fields of view) or at least one visible-light camera and a depth sensor with substantially overlapping fields of view. Flash memory 905 may further include multiple images or video, which are generated via the camera 975.

The mobile device 900 may further include an image display 930, a mobile display driver 935 to control the image display 930, and a display controller 940. In the example of FIG. 9, the image display 930 may include a user input layer 945 (e.g., a touchscreen) that is layered on top of or otherwise integrated into the screen used by the image display 930. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 9 therefore provides a block diagram illustration of the example mobile device 900 with a user interface that includes a touchscreen input layer 945 for receiving input (by touch, multi-touch, or gesture, and the like, by hand, stylus, or other tool) and an image display 930 for displaying content.

As shown in FIG. 9, the mobile device 900 includes at least one digital transceiver (XCVR) 950, shown as WWAN XCVRs, for digital wireless communications via a wide-area wireless mobile communication network. The mobile device 900 also may include additional digital or analog transceivers, such as short-range transceivers (XCVRs) 955 for short-range network communication, such as via NFC, VLC, DECT, ZigBee, BLUETOOTH®, or WI-FI®. For example, short range XCVRs 955 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 900, the mobile device 900 also may include a global positioning system (GPS) receiver. Alternatively, or additionally, the mobile device 900 may utilize either or both the short range XCVRs 955 and WWAN XCVRs 950 for generating location coordinates for positioning. For example, cellular network, WI-FI®, or BLUETOOTH® based positioning systems may generate very accurate location coordinates, particularly when used in combination. Such location coordinates may be transmitted to the mobile device 900 over one or more network connections via XCVRs 950, 955.

The transceivers 950, 955 (i.e., the network communication interface) may conform to one or more of the various digital wireless communication standards utilized by modern mobile networks. Examples of WWAN transceivers 950 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 950, 955 provide two-way wireless communication of information including digitized audio signals, still image and video signals, web page information for display as well as web-related inputs, and various types of mobile message communications to/from the mobile device 900.

The mobile device 900 may further include a microprocessor that functions as the central processing unit (CPU) 910. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 910. The CPU 910, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 910 or processor hardware in smart-phone, laptop computer, and tablet.

The CPU 910 serves as a programmable host controller for the mobile device 900 by configuring the mobile device 900 to perform various operations, for example, in accordance with instructions or programming executable by CPU 910. For example, such operations may include various general operations of the mobile device 900, as well as operations related to the programming for messaging apps and AR camera applications on the mobile device 900. Although a processor may be configured by use of hardwired logic, typical processors in mobile devices are general processing circuits configured by execution of programming.

The mobile device 900 further includes a memory or storage system, for storing programming and data. In the example shown in FIG. 9, the memory system may include flash memory 905, a random-access memory (RAM) 960, and other memory components 965, as needed. The RAM 960 may serve as short-term storage for instructions and data being handled by the CPU 910, e.g., as a working data processing memory. The flash memory 905 typically provides longer-term storage.

Hence, in the example of mobile device 900, the flash memory 905 may be used to store programming or instructions for execution by the CPU 910. Depending on the type of device, the mobile device 900 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

Finally, the mobile device 900 may include an audio transceiver 970 that may receive audio signals from the environment via a microphone (not shown) and provide audio output via a speaker (not shown). Audio signals may be coupled with video signals and other messages by a messaging application or social media application implemented on the mobile device 900. Also, the audio signals may include verbal commands from the user in relation to the IoT devices (e.g., "turn ON lamp").

Techniques described herein also may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

Figure 10:
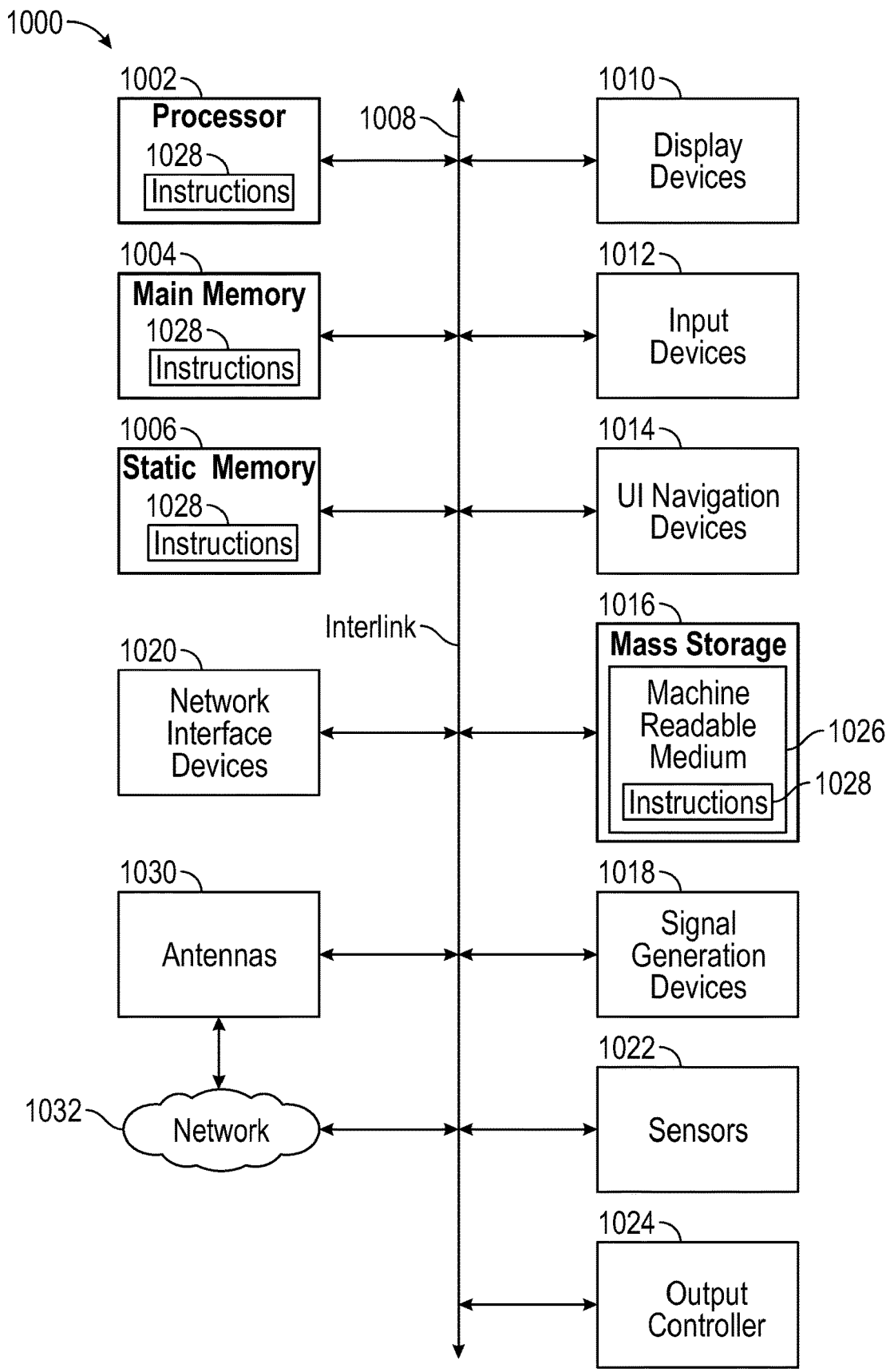
FIG. 10 is a block diagram illustrating a sample configuration of a computer system adapted to implement the backend server systems and methods described herein.

FIG. 10 illustrates a sample configuration of a computer system adapted to implement the systems and methods described herein. In particular, FIG. 10 illustrates a block diagram of an example of a machine 1000 upon which one or more configurations of the AR camera device 110, AR widget user interface 140, backend server 150, and context servers 170 may be implemented. In alternative configurations, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. In sample configurations, the machine 1000 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 1000 may serve as a workstation, a front-end server, or a back-end server of a communication system. Machine 1000 may implement the methods described herein by running the software used to implement the features for enabling AR devices 110 to control IoT devices 160 as described herein. Further, while only a single machine 1000 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010 (shown as a video display), an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a mass storage device (e.g., drive unit) 1016, a signal generation device 1018 (e.g., a speaker), a network interface device 1020, and one or more sensors 1022. Example sensors 1022 include one or more of a global positioning system (GPS) sensor, compass, accelerometer, temperature, light, camera, video camera, sensors of physical states or positions, pressure sensors, fingerprint sensors, retina scanners, or other sensors. The machine 1000 also may include an output controller 1024, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1016 may include a machine readable medium 1026 on which is stored one or more sets of data structures or instructions 1028 (e.g., software) embodying or utilized by any one or more of the techniques or functions described herein. The instructions 1028 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the mass storage device 1016 may constitute machine readable media.

While the machine readable medium 1026 is illustrated as a single medium, the term "machine readable medium" may include a single medium or multiple media (e.g., at least one of a centralized or distributed database, or associated caches and servers) configured to store the one or more instructions 1028. The term "machine readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine readable medium examples may include solid-state memories, and optical and magnetic media. Specific examples of machine readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. The machine readable media includes machine readable media that is not a transitory propagating signal.

The instructions 1028 may further be transmitted or received over communications network 1032 using a transmission medium via the network interface device 1020. The machine 1000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1020 may include one or more physical jacks (e.g., Ethernet, coaxial, or phone jacks) or one or more antennas 1030 to connect to the communications network 1032. In an example, the network interface device 1020 may include a plurality of antennas 1030 to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques.

The features and flow charts described herein can be embodied in on one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating systems. In this example, the third party application can invoke API calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the programming, media content or metadata files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine readable medium may take many forms of tangible storage medium. Non-volatile storage media include, for example, optical or magnetic disks, such as any of the storage devices in any computer(s) or the like, such as may be used to implement the AR device 110, backend server 150, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of generating an interactive experience using an augmented reality (AR) device to interact with at least one Internet of Things (IoT) device, comprising:
   receiving a selection of the at least one IoT device to be controlled by the AR device during the interactive experience;
   providing an AR user interface widget or graphical representation for the selected at least one IoT device to the AR device as an overlay on a display of the AR device;
   programming the interactive experience by generating a program of behaviors of the selected at least one IoT device using at least one of logic gates or control circuits connected to the selected at least one IoT device in a visual programming interface of the AR device, the logic gates and control circuits together specifying the behaviors to be performed by the at least one IoT device in the visual programming interface,
   wherein programming the interactive experience comprises connecting respective IoT devices, logic gates, and control circuits to specify program logic and information flow to be used in the interactive experience by attaching an output port of one IoT device, logic gate, or control circuit directly to an input port of another IoT device, logic gate, or control circuit;
   and
   executing the program of behaviors to selectively control the at least one IoT device during the interactive experience.

2. The method of claim 1, further comprising:
   registering the at least one IoT device in response to registration information received from the at least one IoT device, the registration information including device input and output information for the at least one IoT device; and
   determining from the registration information a type of AR user interface widget or graphical representation to render on the display for the at least one IoT device.

3. The method of claim 1, further comprising registering the AR device and receiving location information from the AR device.

4. The method of claim 1, wherein programming the interactive experience by generating the program of behaviors of the at least one IoT device selection comprises accessing at least one of logic gates or control circuits through the visual programming interface of the AR device.

5. The method of claim 1, wherein generating the program of behaviors of the selected at least one IoT device is based on input/output rules for the at least one IoT device, where the input/output rules are represented via Boolean logic, arithmetic functions, n-ary mappings, or operations that are definable mathematically.

6. The method of claim 1, wherein generating the program of behaviors of the selected at least one IoT device comprises selecting the control circuits to express functions including at least one of a threshold, a clamping function, or an oscillator.

7. The method of claim 1, further comprising representing the at least one of logic gates or control circuits in the visual programming interface on the display of the AR device as a three-dimensional box with attachment points for input and output connections to other logic gates, control circuits, and IoT devices, the three-dimensional box including a symbol that describes a behavior represented by the three-dimensional box.

8. The method of claim 1, wherein programming the interactive experience comprises using a haptic device to employ force feedback when a logic gate or control circuit is adjusted or connected to another logic gate, control circuit, or IoT device.

9. The method of claim 1, wherein programming the interactive experience comprises generating a sequence of actions to be performed by the at least one IoT device during the interactive experience.

10. The method of claim 9, wherein generating the sequence of actions to be performed by the at least one IoT device during the interactive experience comprises sampling a state of the at least one IoT device and applying the sampled state to a step in a timeline of the generated sequence of actions.

11. The method of claim 1, wherein programming the interactive experience comprises using connectors in the visual programming interface of the AR device to connect respective IoT devices, logic gates, and control circuits to specify program logic and information flow to be used in the interactive experience.

12. The method of claim 1, wherein connecting respective IoT devices, logic gates, and control circuits to specify program logic and information flow to be used in the interactive experience comprises using at least one gateway node to logically connect respective IoT devices, logic gates, and control circuits separated by a distance in the display of the AR device.

13. The method of claim 1, wherein connecting respective IoT devices, logic gates, and control circuits to specify program logic and information flow to be used in the interactive experience comprises using at least one IoT device proxy that represents the at least one IoT device at a spatially separated location from the at least one IoT device and exposes inputs and outputs of the at least one IoT device.

14. The method of claim 1, wherein executing the program of behaviors to selectively control the at least one IoT device during the interactive experience comprises dividing execution of the program of behaviors into discrete time steps and updating a state of the at least one IoT device during respective discrete time steps.

15. The method of claim 1, further comprising debugging and playing back the program of behaviors of the interactive experience via a debugging and playback user interface of the AR device.

16. An augmented reality (AR) device that generates an interactive experience with at least one Internet of Things (IoT) device, comprising:
   a display;
   a user input device;
   a runtime module that determines a type of AR user interface widget or graphical representation to render for the at least one IoT device on the display, that receives a selection of the at least one IoT device to be controlled during the interactive experience, and that provides the determined type of AR user interface widget or graphical representation for the selected at least one IoT device to the display as an overlay; and
   an experience generation user interface that provides a visual programming interface through which a user provides inputs via the user input device to program the interactive experience by generating a program of behaviors of the selected at least one IoT device using at least one of logic gates or control circuits connected to the selected at least one IoT device in the visual programming interface, the logic gates and control circuits together specifying the behaviors to be performed by the at least one IoT device; as a sequence of actions to be performed by the at least one IoT device during the interactive experience, wherein the runtime module executes the program of behaviors to selectively control the at least one IoT device during the interactive experience programmed by the user.

17. The AR device of claim 16, further comprising a registration module that registers the at least one IoT device in response to registration information received from the at least one IoT device, the registration information including device input and output information for the at least one IoT device, that determines from the registration information the type of AR user interface widget or graphical representation to render on the display for the at least one IoT device.

18. The AR device of claim 16, wherein the experience generation user interface is a builder component that includes user interface components including at least one of (a) an IoT device user interface for interacting with the at least one IoT device to attach logic gates or control circuits to inputs or outputs of the at least one IoT device; (b) a logic gate/control circuit user interface that provides access to logic gates for programming behaviors based on input/output rules of the IoT devices that are represented via Boolean logic, arithmetic functions, n-ary mappings, or operations that are definable mathematically, and to control circuits to express functions including at least one of a threshold, a clamping function, or an oscillator; or (c) a sequencer user interface for defining a sequence of actions to be performed by the at least one IoT device as part of the interactive experience.

19. A non-transitory computer readable medium having stored thereon instructions, wherein execution of the instructions by one or more processors cause the one or more processors to generate an interactive experience using an augmented reality (AR) device to interact with at least one Internet of Things (IoT) device by performing operations including:

receiving a selection of the at least one IoT device to be controlled by the AR device during the interactive experience;

providing an AR user interface widget or graphical representation for the selected at least one IoT device to the AR device as an overlay on a display of the AR device;

programming the interactive experience by generating a program of behaviors of the selected at least one IoT device using at least one of logic gates or control circuits connected to the selected at least one IoT device in a visual programming interface of the AR device, the logic gates and control circuits together specifying the behaviors to be performed by the at least one IoT device; and executing the program of behaviors to selectively control the at least one IoT device during the interactive experience; and debugging and playing back the program of behaviors of the interactive experience via a debugging and playback user interface of the AR device.

20. A method of generating an interactive experience using an augmented reality (AR) device to interact with at least one Internet of Things (IoT) device, comprising:

receiving a selection of the at least one IoT device to be controlled by the AR device during the interactive experience;

providing an AR user interface widget or graphical representation for the selected at least one IoT device to the AR device as an overlay on a display of the AR device;

programming the interactive experience by generating a program of behaviors of the selected at least one IoT device using at least one of logic gates or control circuits connected to the selected at least one IoT device in a visual programming interface of the AR device, the logic gates and control circuits together specifying the behaviors to be performed by the at least one IoT device in the visual programming interface, wherein executing the program of behaviors to selectively control the at least one IoT device during the interactive experience comprises dividing execution of the program of behaviors into discrete time steps and updating a state of the at least one IoT device during respective discrete time steps; and executing the program of behaviors to selectively control the at least one IoT device during the interactive experience.

* * * * *